United States Patent
Wang

(10) Patent No.: US 12,111,459 B2
(45) Date of Patent: Oct. 8, 2024

(54) TERAHERTZ CARRIER-ENVELOPE PHASE SHIFTER

(71) Applicant: GBA BRANCH OF AEROSPACE INFORMATION RESEARCH INSTITUTE, CHINESE ACADEMY OF SCIENCES, Huangpu Guangzhou (CN)

(72) Inventor: Tianwu Wang, Huangpu Guangzhou (CN)

(73) Assignee: GBA BRANCH OF AEROSPACE INFORMATION RESEARCH INSTITUTE, CHINESE ACADEMY OF SCIENCES, Guangzhou (CN)

( * ) Notice: Subject to any disclaimer, the term of this patent is extended or adjusted under 35 U.S.C. 154(b) by 0 days.

(21) Appl. No.: 18/577,612

(22) PCT Filed: Jul. 8, 2022

(86) PCT No.: PCT/CN2022/104652
§ 371 (c)(1),
(2) Date: Jan. 8, 2024

(87) PCT Pub. No.: WO2023/029749
PCT Pub. Date: Mar. 9, 2023

(65) Prior Publication Data
US 2024/0264427 A1 Aug. 8, 2024

(30) Foreign Application Priority Data
Sep. 3, 2021 (CN) .......................... 202111036188.1

(51) Int. Cl.
G02B 26/06 (2006.01)
G02F 1/00 (2006.01)
H01P 1/18 (2006.01)

(52) U.S. Cl.
CPC ............... *G02B 26/06* (2013.01); *G02F 1/00* (2013.01); *H01P 1/18* (2013.01)

(58) Field of Classification Search
CPC .............. G02B 26/06; G02F 1/00; H01P 1/18
(Continued)

(56) References Cited

FOREIGN PATENT DOCUMENTS

| CN | 105353532 A | 2/2016 |
|----|-------------|--------|
| CN | 108614316 A | 10/2018 |

(Continued)

OTHER PUBLICATIONS

Rutledge, David et al., "Active Grids for Quasi-Optical Power Combining," Proceedings of ISSE 95-International Symposium on Signals, Systems and Electronics, San Francisco, CA, Oct. 25-27, 1995, Aug. 6, 2002 pp. 142-144.
(Continued)

*Primary Examiner* — William Choi
(74) *Attorney, Agent, or Firm* — MUNCY, GEISSLER, OLDS & LOWE, P.C.

(57) ABSTRACT

A terahertz carrier-envelope phase shifter includes a substrate, a first phase modulator and a second phase modulator, which are arranged on a surface of the substrate. The first phase modulator has a first phase modulation angle. The second phase modulator has a second phase modulation angle that is different from the first phase modulation angle. A carrier-envelope phase of a terahertz pulse after the terahertz pulse passes through the first phase modulator and the substrate is different from a carrier-envelope phase of the terahertz pulse after the terahertz pulse passes through the second phase modulator and the substrate. By means of the simple displacement, a terahertz pulse can pass through different phase modulators to obtain the required carrier-envelope phases. A geometric parameter and the spatial position of a microstructure in the first or the second phase (Continued)

modulator are changed and the carrier-envelope phases of the terahertz pulse covers 0-2 $\pi$.

10 Claims, 8 Drawing Sheets

(58) Field of Classification Search
USPC .......................................................... 359/237
See application file for complete search history.

(56) References Cited

FOREIGN PATENT DOCUMENTS

| CN | 109991766 A | 7/2019 |
|---|---|---|
| CN | 110133759 A | 8/2019 |
| CN | 110346997 A | 10/2019 |
| CN | 111679456 A | 9/2020 |
| CN | 112582858 A | 3/2021 |
| CN | 113871820 A | 12/2021 |

OTHER PUBLICATIONS

Kawada, Yoichi et al., "Controlled shifting of carrier-envelope phase of broadband terahertz pulses using prism wave plates," 2016 41st International Conference on Infrared, Millimeter, and Terahertz waves(IRMMW-THz), Copenhagen, Denmark, Sep. 25-30, 2016, Dec. 1, 2016, 2 pages.

Wang, Yufang et al., "High-gain Low-Sidelobe Transmitarray Antennas," 2020 Cross Strait Radio Science & Wireless Technology Conference (CSRSWTC), Fuzhou, China, Dec. 13-16, 2020, Mar. 22, 2022, 3 pages.

TERAHERTZ CARRIER-ENVELOPE PHASE SHIFTER

FIELD OF THE INVENTION

The present disclosure relates to the field of terahertz technology, and particularly to a terahertz carrier-envelope phase shifter.

BACKGROUND OF THE INVENTION

The internal phase of an ultrashort pulse is referred to as a carrier-envelope phase, which is an important parameter for the interaction of few-cycle pulses with matter. The development of high power terahertz sources enables researchers to induce interaction of strong-field terahertz pulses with matter. When such ultrashort pulses interact with matter, the interaction depends not only on the intensity envelope curve of the pulses, but also on the phase of the carrier. Many interactions between light and matter depend on carrier-envelope phases. Therefore, the control technology of the carrier-envelope phases of ultrashort pulses is important, for example, in controlling the collective motion of electrons in plasma, the direction of tunnel current in a scanning tunneling microscope, and optical polarization. In terahertz band, there is a lack of natural materials that can control the carrier-envelope phases of terahertz pulses efficiently. In general, different types of prism wave plates or electro-optical prisms are cascaded to control the carrier-envelope phases of terahertz pulses. However, these schemes are inconvenient to operate, inefficient, and difficult to integrate in practical applications, which greatly limits the practical application of terahertz carrier-envelope phase shifters in specific fields.

SUMMARY OF THE INVENTION

In order to overcome the disadvantages in the prior art, the present disclosure provides a terahertz carrier-envelope phase shifter to solve the existing inconvenience of carrier-envelope phase control of terahertz pulses.

An embodiment of the present disclosure provides a terahertz carrier-envelope phase shifter, including:
  a substrate;
  a first phase modulator arranged on a surface of the substrate, where the first phase modulator has a first phase modulation angle; and
  a second phase modulator arranged on the surface of the substrate, where the second phase modulator has a second phase modulation angle that is different from the first phase modulation angle, so that a carrier-envelope phase of a terahertz pulse after the terahertz pulse passes through the first phase modulator and the substrate is different from a carrier-envelope phase of the terahertz pulse after the terahertz pulse passes through the second phase modulator and the substrate.

In an embodiment, the first phase modulator includes a first dielectric plate, a first transverse metal wire grating, a first longitudinal metal wire grating, and a first resonator, where the first transverse metal wire grating and the first longitudinal metal wire grating are arranged on two opposite surfaces of the first dielectric plate, the first resonator is arranged inside the first dielectric plate and is positioned between the first transverse metal wire grating and the first longitudinal metal wire grating, the first resonator has a first symmetry axis, and the first symmetry axis is at a first included angle to a transverse direction; and/or
  the second phase modulator includes a second dielectric plate, a second transverse metal wire grating, a second longitudinal metal wire grating, and a second resonator, where the second transverse metal wire grating and the second longitudinal metal wire grating are arranged on two opposite surfaces of the second dielectric plate, the second resonator is arranged inside the second dielectric plate and is positioned between the second transverse metal wire grating and the second longitudinal metal wire grating, the second resonator has a second symmetry axis, and the second symmetry axis is at a second included angle to the transverse direction.

In an embodiment, the first included angle between the first symmetry axis of the first resonator and the transverse direction is different from the second included angle between the second symmetry axis of the second resonator and the transverse direction.

In an embodiment, the first transverse metal wire grating is positioned on a first plane, the first longitudinal metal wire grating is positioned on a second plane, the first resonator is positioned on a third plane, and the first plane, the second plane, and the third plane are arranged in parallel; and/or
  geometric centers of the first transverse metal wire grating, the first longitudinal metal wire grating, and the first resonator are arranged coaxially; and/or
  the second transverse metal wire grating is positioned on a fourth plane, the second longitudinal metal wire grating is positioned on a fifth plane, the second resonator is positioned on a sixth plane, and the fourth plane, the fifth plane, and the sixth plane are arranged in parallel; and/or
  geometric centers of the second transverse metal wire grating, the second longitudinal metal wire grating, and the second resonator are arranged coaxially.

In an embodiment, the first plane and the fourth plane are arranged coplanar; and/or
  the second plane and the fifth plane are arranged coplanar; and/or
  the third plane and the sixth plane are arranged coplanar.

In an embodiment, the first phase modulator or the second phase modulator has a transverse width in a range of 66-86 microns; and the first phase modulator or the second phase modulator has a longitudinal width in a range of 66-86 microns.

In an embodiment, the first dielectric plate or the second dielectric plate is selected from one or more of a polyimide plate or a silica plate; and/or
  the first dielectric plate or the second dielectric plate has a side length in a range of 66-86 microns; and the first dielectric plate or the second dielectric plate has a thickness in a range of 50-70 microns.

In an embodiment, metal portions of the first transverse metal wire grating, the first longitudinal metal wire grating, the second transverse metal wire grating, or the second longitudinal metal wire grating are selected from one or more of a gold sheet, a copper sheet, or an aluminum sheet; and/or
  the metal portions of the first transverse metal wire grating, the first longitudinal metal wire grating, the second transverse metal wire grating, or the second longitudinal metal wire grating have a thickness in a range of 0.2-0.8 micron.

In an embodiment, the first transverse metal wire grating, the first longitudinal metal wire grating, the second transverse metal wire grating, or the second longitudinal metal wire grating has a long side of 76 microns; and/or the first transverse metal wire grating, the first longitudinal metal wire grating, the second transverse metal wire grating, or the second longitudinal metal wire grating has a short side of 68 microns; and/or the metal portions of the first transverse metal wire grating, the first longitudinal metal wire grating, the second transverse metal wire grating, or the second longitudinal metal wire grating has a width of 8 microns; and/or an edge gap between two adjacent metal portions of the first transverse metal wire grating, the first longitudinal metal wire grating, the second transverse metal wire grating, or the second longitudinal metal wire grating is 8 microns.

In an embodiment, the first resonator or the second resonator is selected from one of a V-shaped metal sheet or a C-shaped metal sheet; and/or the first resonator or the second resonator has a thickness in a range of 0.2-0.8 micron; and/or the first resonator or the second resonator has an outer diameter in a range of 25-40 microns; and/or the first resonator or the second resonator has an inner diameter in a range of 20-35 microns; and/or the first resonator or the second resonator has an opening angle in a range of 20 degrees to 150 degrees.

In an embodiment, the first included angle between the first symmetry axis of the first resonator and the transverse direction is in a range of 40 degrees to 50 degrees; and/or the second included angle between the second symmetry axis of the second resonator and the transverse direction is in a range of −50 degrees to −40 degrees; and/or a third included angle is formed between the first symmetry axis of the first resonator and the second symmetry axis of the second resonator, where the third included angle is 90 degrees.

In an embodiment, a beam diameter of the terahertz pulse is 0.5-1.0 times a longitudinal side length of the first phase modulator or the second phase modulator.

In an embodiment, a transverse side length of the substrate is greater than or equal to a sum of transverse side lengths of the first phase modulator and the second phase modulator; and/or a longitudinal side length of the substrate is greater than or equal to a sum of longitudinal side lengths of the first phase modulator and the second phase modulator; and/or the substrate has a thickness in a range of 50-100 microns.

In an embodiment, the first phase modulator and the second phase modulator are arranged on left and right sides or on upper and lower sides of the surface of the substrate.

In an embodiment, the terahertz carrier-envelope phase shifter further includes:

a third phase modulator having a phase modulation angle that is different from those of the first phase modulator and the second phase modulator;

a fourth phase modulator having a phase modulation angle that is different from those of the first phase modulator, the second phase modulator, and the third phase modulator;

the first phase modulator, the second phase modulator, the third phase modulator, and the fourth phase modulator are arranged in a matrix on the surface of the substrate, or the first phase modulator, the second phase modulator, the third phase modulator, and the fourth phase modulator are arranged circumferentially on the surface of the substrate.

In the terahertz carrier-envelope phase shifter provided by the embodiments of the present disclosure, by arranging a first phase modulator and a second phase modulator such that a first phase modulation angle of the first phase modulator is different from a second phase modulation angle of the second phase modulator, a carrier-envelope phase of a terahertz pulse after the terahertz pulse passes through the first phase modulator and the substrate is different from a carrier-envelope phase of the terahertz pulse after the terahertz pulse passes through the second phase modulator and the substrate. In the terahertz carrier-envelope phase shifter, by means of the simple displacement of the terahertz carrier-envelope phase shifter, a terahertz pulse can pass through different phase modulators to obtain the required carrier-envelope phases on one hand. On the other hand, a geometric parameter and the spatial position of the microstructure in the first phase modulator or the second phase modulator are changed, such that the carrier-envelope phases of the terahertz pulse can cover 0-2 $\pi$, and the polarity of the electric field of the terahertz pulse is thus adjusted. Compared with a traditional terahertz carrier-envelope phase shifter, the terahertz carrier-envelope phase shifter provided by the embodiments of the present disclosure has advantages of lightness and thinness, high efficiency, low cost, simple operation, and easiness in on-chip integration.

BRIEF DESCRIPTION OF THE DRAWINGS

In order to illustrate the technical solutions in the embodiments of the present disclosure or in the related art more clearly, the following briefly introduces the accompanying drawings for describing the embodiments or the related art. Apparently, the accompanying drawings in the following description show merely some embodiments of the present disclosure, and a person of ordinary skill in the art may still derive other drawings from the structures shown in the accompanying drawings without creative efforts.

DETAILED DESCRIPTION OF THE EMBODIMENTS

Figure 1:
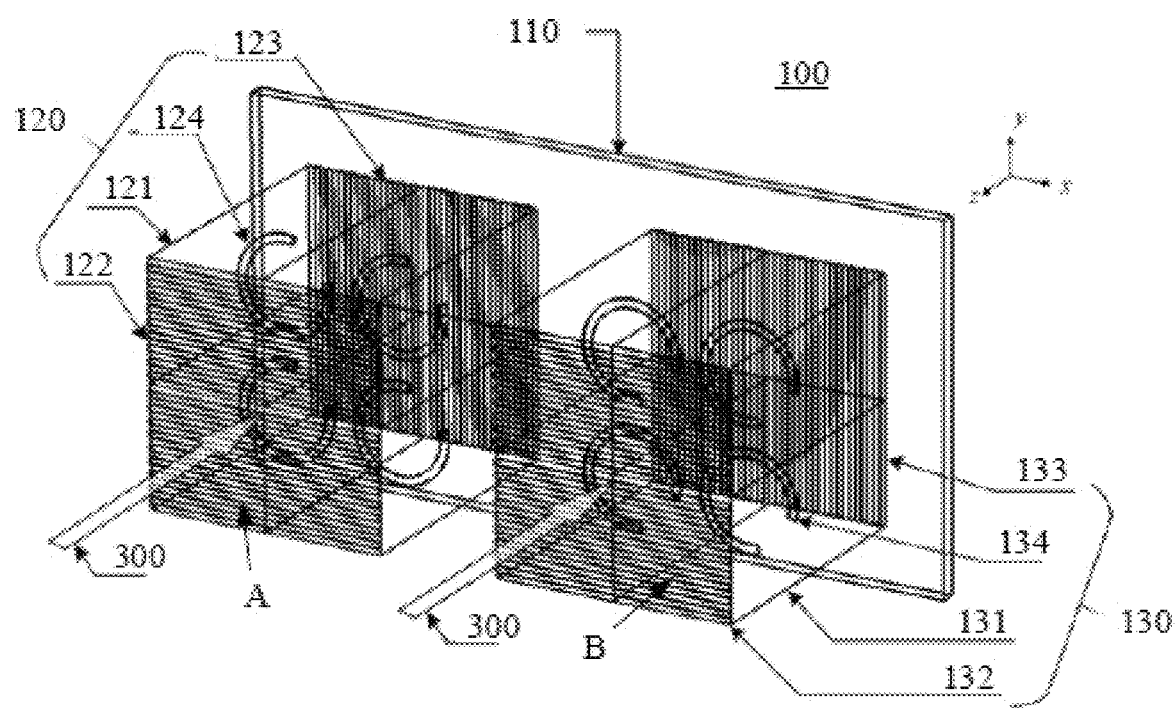
FIG. 1 is a structural diagram of a terahertz carrier-envelope phase shifter according to an embodiment of the present disclosure.

The technical solution in the embodiments of the present disclosure will now be described more clearly and fully hereinafter with reference to the accompanying drawings in the embodiments of the present disclosure. It is obvious that the embodiments described are only a few, but not all embodiments of the present disclosure. Based on the embodiments of the present disclosure, all other embodiments obtained by a person of ordinary skill in the art without inventive effort shall fall within the protection scope of the present disclosure.

It is noted that, if directional indications such as up, down, left, right, front, and rear are involved in the embodiments of the present disclosure, the directional indications are only used to explain relative positional relationships, motion, etc., between components in a specific posture, and if the specific posture is changed, the directional indications are changed accordingly.

In addition, the descriptions related to "first" and "second", if present in the embodiments of the present disclosure, are used for descriptive purposes only and are not to be construed as indicating or suggesting relative importance thereof or as implicitly designating the number of technical features indicated. Thus, a feature defined as "first" or "second" may explicitly or implicitly include at least one of such features. In addition, "and/or", when appearing throughout the text, is intended to include three parallel schemes, such as "A and/or B" which includes a scheme A, a scheme B, or a scheme where both A and B are met. In addition, the technical solutions of various embodiments can be combined with each other, but on a basis that the technical solutions can be realized by a person skilled in the art. When the combination of technical solutions is contradictory or impossible to implement, it is considered that the combination of the technical solutions does not exist and the combination is not within the protection scope of the present disclosure.

An embodiment of the present disclosure provides a terahertz carrier-envelope phase shifter, including:
 a substrate;
 a first phase modulator arranged on a surface of the substrate, where the first phase modulator has a first phase modulation angle; and
 a second phase modulator arranged on the surface of the substrate, where the second phase modulator has a second phase modulation angle that is different from the first phase modulation angle, so that a carrier-envelope phase of a terahertz pulse after the terahertz pulse passes through the first phase modulator and the substrate is different from a carrier-envelope phase of the terahertz pulse after the terahertz pulse passes through the second phase modulator and the substrate.

In the terahertz carrier-envelope phase shifter provided by the embodiments of the present disclosure, by arranging a first phase modulator and a second phase modulator such that a first phase modulation angle of the first phase modulator is different from a second phase modulation angle of the second phase modulator, a carrier-envelope phase of a terahertz pulse after the terahertz pulse passes through the first phase modulator and the substrate is different from a carrier-envelope phase of the terahertz pulse after the terahertz pulse passes through the second phase modulator and the substrate. In the terahertz carrier-envelope phase shifter, by means of the simple displacement of the terahertz carrier-envelope phase shifter, a terahertz pulse can pass through different phase modulators to obtain the required carrier-envelope phases on one hand. On the other hand, a geometric parameter and the spatial position of a microstructure in the first phase modulator or the second phase modulator are changed, such that the carrier-envelope phases of the terahertz pulse can cover 0-2 $\pi$, and the polarity of the electric field of the terahertz pulse is thus adjusted. Compared with a traditional terahertz carrier-envelope phase shifter, the terahertz carrier-envelope phase shifter provided by the embodiments of the present disclosure has advantages of lightness and thinness, high efficiency, low cost, simple operation, and easiness in on-chip integration.

Referring to FIG. 1, an embodiment of the present disclosure provides a terahertz carrier-envelope phase shifter 100. The terahertz carrier-envelope phase shifter 100 includes a substrate 110, and a first phase modulation array A and a second phase modulation array B arranged on a surface of the substrate 110. In this embodiment, the substrate 110 is a silicon substrate made of a high-resistance silicon wafer. The first phase modulation array A and the second phase modulation array B are used for adjusting carrier-envelope phases of a terahertz pulse 300. In specific application of the terahertz carrier-envelope phase shifter 100, a terahertz wave is incident on one side of the substrate 110 having the first phase modulation array A or the second phase modulation array B, and exits from the other side of the substrate 110. Specifically, after the terahertz wave sequentially passes through the first phase modulation array A and the substrate 110, the terahertz wave has a first carrier-envelope phase. After the terahertz wave sequentially passes through the second phase modulation array B and the substrate 110, the terahertz wave has a second carrier-envelope phase. The first carrier-envelope phase is different from the second carrier-envelope phase.

In an embodiment, a transverse side length of the substrate 110 is greater than or equal to a sum of transverse side lengths of the first phase modulation array A and the second phase modulation array B. A longitudinal side length of the substrate 110 is greater than or equal to a sum of longitudinal side lengths of the first phase modulation array A and the second phase modulation array B. By setting the transverse side length and the longitudinal side length of the substrate 110, when the terahertz pulse 300 is transmitted from the first phase modulation array A to the substrate 110 or from the second phase modulation array B to the substrate 110, it can be ensured that the terahertz pulse 300 exits to the outside through the substrate 110. The substrate 110 may have a thickness in a range of 50-100 microns as desired.

In an embodiment, a beam diameter of the terahertz pulse 300 is 0.5-1.0 times a longitudinal side length of the first phase modulation array A or the second phase modulation array B. At this time, when the terahertz pulse 300 is incident on the first phase modulation array A, the incident area may be limited only within the area of the first phase modulation array A; when the terahertz pulse 300 is incident on the second phase modulation array B, the incident area may be limited only within the area of the second phase modulation array B. The beam diameter of the terahertz pulse 300 is set in such a manner that the terahertz pulse 300 does not interfere when incident on the first phase modulation array A and when incident on the second phase modulation array B.

In this embodiment, the first phase modulation array A includes a plurality of first phase modulators 120. The second phase modulation array B includes a plurality of second phase modulators 130. Specifically, the first phase modulation array A includes n*m first phase modulators 120; and the second phase modulation array B includes n*m second phase modulators 130, where n is greater than or equal to 2; and m is greater than or equal to 2. It is to be understood that the number of first phase modulators 120 in the first phase modulation array A may also be different from the number of second phase modulators 130 in the second phase modulation array B, which may be specifically set according to actual needs. In this embodiment, there are 4 first phase modulators 120 which are arranged in a 2*2 matrix. There are 4 second phase modulators 130 which are arranged in a 2*2 matrix.

In this embodiment, the first phase modulator 120 is arranged on the surface of the substrate 110. The first phase modulator 120 has a first phase modulation angle φ1.

The second phase modulator 130 is arranged on the surface of the substrate 110. The second phase modulator 130 has a second phase modulation angle φ2 that is different from the first phase modulation angle φ1, so that a carrier-envelope phase of a terahertz pulse 300 after the terahertz pulse 300 passes through the first phase modulator 120 and the substrate 110 is different from a carrier-envelope phase of the terahertz pulse 300 after the terahertz pulse 300 passes through the second phase modulator 130 and the substrate 110.

By arranging the first phase modulator 120 and the second phase modulator 130 such that the first phase modulation angle φ1 of the first phase modulator 120 is different from the second phase modulation angle φ2 of the second phase modulator 130, a carrier-envelope phase of a terahertz pulse 300 after the terahertz pulse 300 passes through the first phase modulator 120 and the substrate 110 is different from a carrier-envelope phase of the terahertz pulse 300 after the terahertz pulse 300 passes through the second phase modulator 130 and the substrate 110. In the terahertz carrier-envelope phase shifter 100, by means of the simple displacement of the terahertz carrier-envelope phase shifter 100, a terahertz pulse 300 can pass through different phase modulators (the first phase modulator 120 or the second phase modulator 130) to obtain the required carrier-envelope phases on one hand. On the other hand, a geometric parameter and the spatial position of a microstructure in the first phase modulator 120 or the second phase modulator 130 are changed, such that the carrier-envelope phases of the terahertz pulse 300 can cover 0-2 π, and the polarity of the electric field of the terahertz pulse 300 is thus adjusted.

Figure 2:
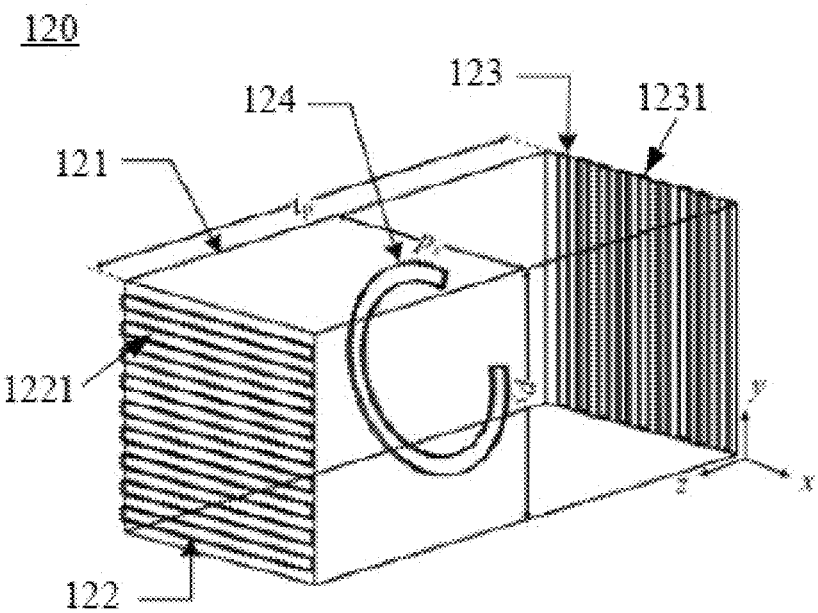
FIG. 2 is a structural diagram of a first phase modulator of FIG. 1.
Figure 3:
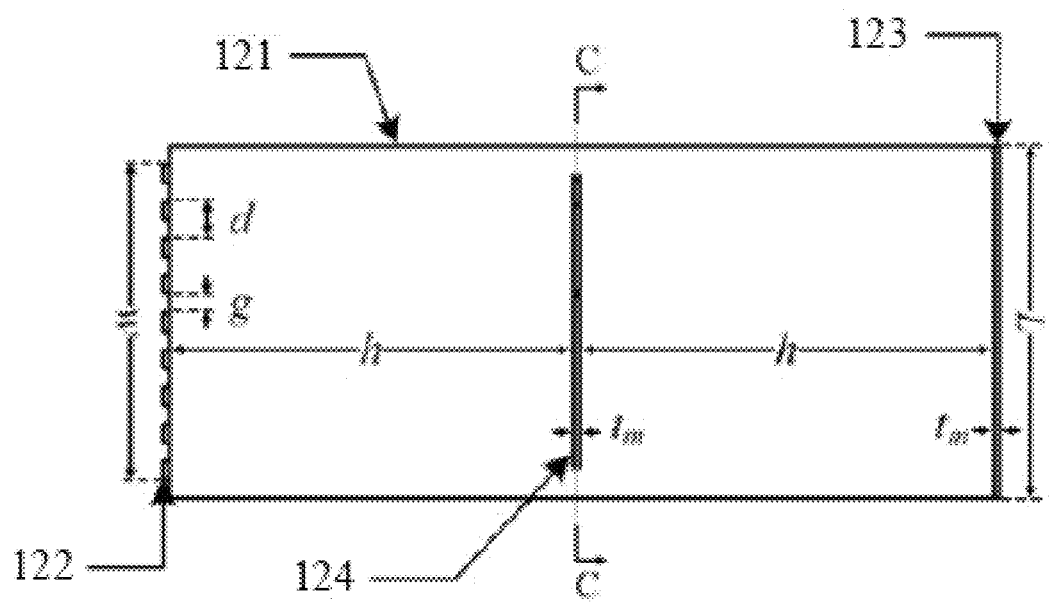
FIG. 3 is a side view of the first phase modulator of FIG. 2.
Figure 4:
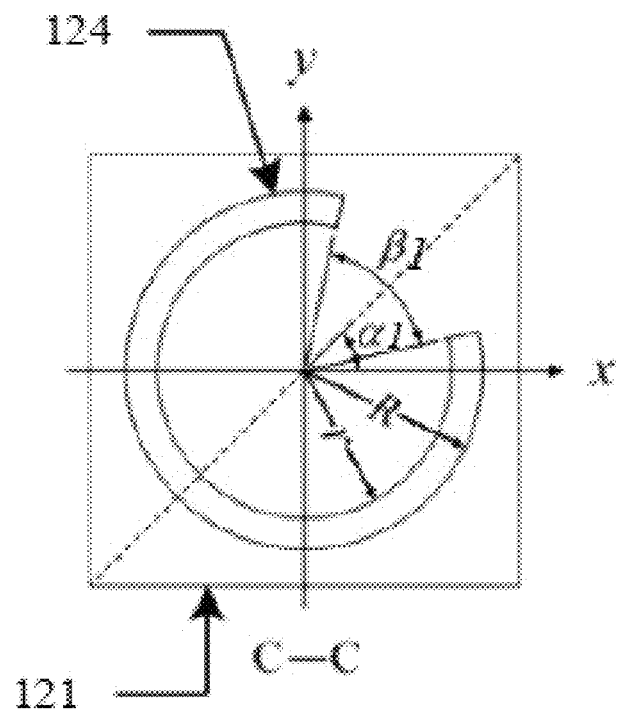
FIG. 4 is a cross-sectional view of the first phase modulator of FIG. 3 along a direction of C-C.

Referring to FIGS. 2-4 together, in an embodiment, the first phase modulator 120 includes a first dielectric plate 121, a first transverse metal wire grating 122, a first longitudinal metal wire grating 123, and a first resonator 124. The first transverse metal wire grating 122 and the first longitudinal metal wire grating 123 are arranged on two opposite surfaces of the first dielectric plate 121. In this embodiment, the first longitudinal metal wire grating 123 is arranged on a surface of the first dielectric plate 121 facing the substrate 110. The first transverse metal wire grating 122 is arranged on a surface of the first dielectric plate 121 opposite the substrate 110. The first resonator 124 is arranged inside the first dielectric plate 121 and is positioned between the first transverse metal wire grating 122 and the first longitudinal metal wire grating 123. The first resonator 124 has a first symmetry axis. The first symmetry axis is at a first included angle α1 to a transverse direction. In specific application, the terahertz pulse 300 is incident on a side of the first dielectric plate 121 having the first transverse metal wire grating 122, passes through the first resonator 124, exits from a side of the first dielectric plate 121 having the first longitudinal metal wire grating 123, and then exits to the external environment through the substrate 110.

Figure 5:
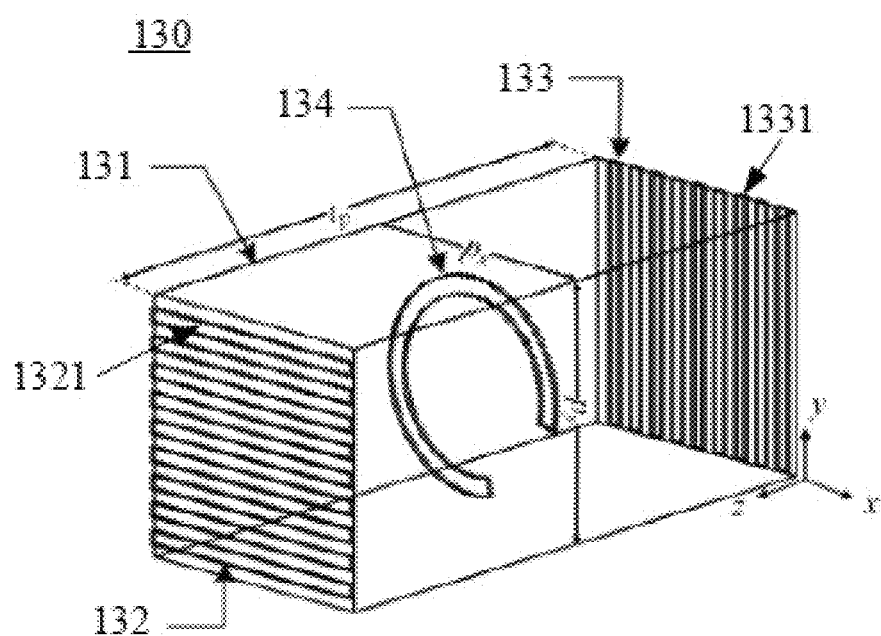
FIG. 5 is a structural diagram of a second phase modulator of FIG. 1.
Figure 6:
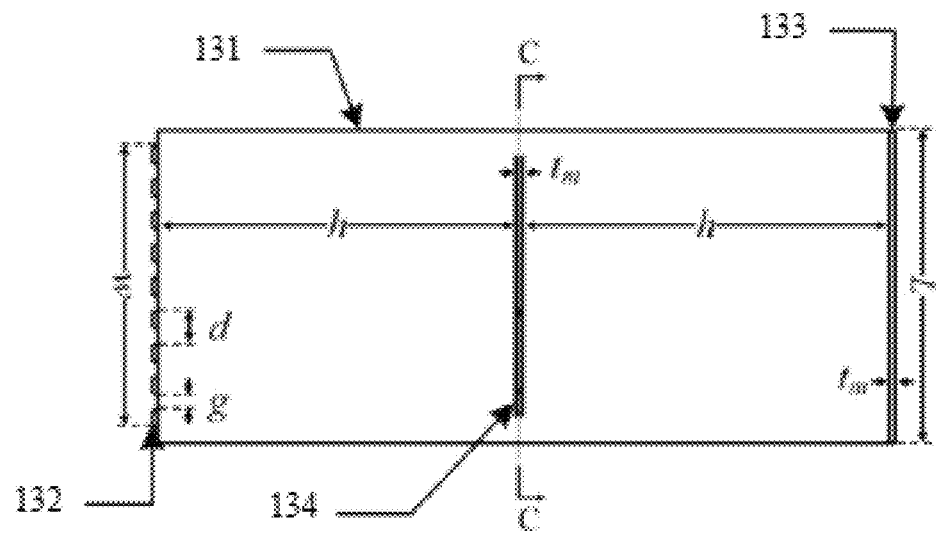
FIG. 6 is a side view of the second phase modulator of FIG. 5.
Figure 7:
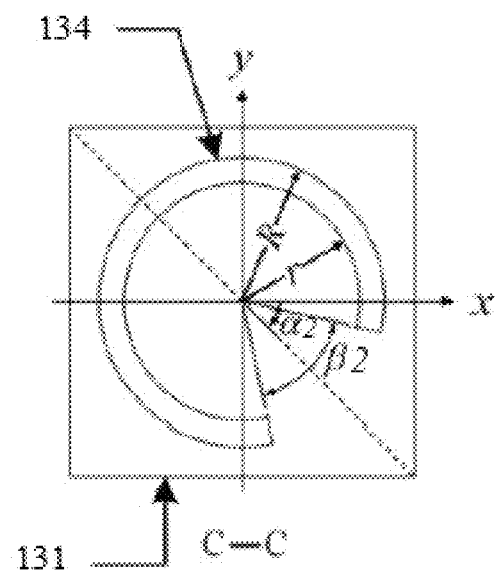
FIG. 7 is a cross-sectional view of the second phase modulator of FIG. 6 along a direction of C-C.

Referring to FIGS. 5 to 7 together, the second phase modulator 130 includes a second dielectric plate 131, a second transverse metal wire grating 132, a second longitudinal metal wire grating 133, and a second resonator 134. The second transverse metal wire grating 132 and the second longitudinal metal wire grating 133 are arranged on two opposite surfaces of the second dielectric plate 131. In this embodiment, the second longitudinal metal wire grating 133 is arranged on a surface of the second dielectric plate 131 facing the substrate 110. The second transverse metal wire grating 132 is arranged on a surface of the second dielectric plate 131 opposite to the substrate 110. The second resonator 134 is arranged inside the second dielectric plate 131 and is positioned between the second transverse metal wire grating 132 and the second longitudinal metal wire grating 133. The second resonator 134 has a second symmetry axis. The second symmetry axis is at a second included angle α2 to the transverse direction.

In an embodiment, the first included angle α1 between the first symmetry axis of the first resonator 124 and the transverse direction is different from the second included angle α2 between the second symmetry axis of the second resonator 134 and the transverse direction. The direction of a symmetry axis of a resonator is related to the phase modulation angle thereof. When the first included angle α1 between the first symmetry axis of the first resonator 124 and the transverse direction is different from the second included angle α2 between the second symmetry axis of the second resonator 134 and the transverse direction, a carrier-envelope phase of the terahertz pulse 300 after the terahertz pulse 300 passes through the first resonator 124 is different from a carrier-envelope phase of the terahertz pulse 300 after the terahertz pulse 300 passes through the second resonator 134 as well. Therefore, by arranging the first resonator 124 and the second resonator 134, the phases of the terahertz pulse 300 may be modulated.

In an embodiment, the first resonator 124 or the second resonator 134 is an open resonant ring. Specifically, the first resonator 124 or the second resonator 134 is selected from one or more of a V-shaped metal sheet or a C-shaped metal sheet. In this embodiment, the first resonator 124 or the second resonator 134 is a C-shaped metal sheet. Specifically, the first resonator 124 or the second resonator 134 has a thickness in a range of 0.2-0.8 micron; and/or the first resonator 124 or the second resonator 134 has an outer diameter in a range of 25-40 microns; and/or the first resonator 124 or the second resonator 134 has an inner diameter in a range of 20-35 microns; and/or the first resonator 124 has an opening angle β1 in a range of 20 degrees to 150 degrees; and/or the second resonator 134 has an opening angle β2 in a range of 20 degrees to 150 degrees. By setting the values of the thickness, the outer diameter, the inner diameter, and the opening angle of the first resonator 124 or the second resonator 134, the first resonator 124 or the second resonator 134 can effectively modulate the carrier-envelope phases of the terahertz pulse 300.

In an embodiment, the first included angle α1 between the first symmetry axis of the first resonator 124 and the transverse direction is in a range of 40 degrees to 50 degrees; and/or the second included angle α2 between the second symmetry axis of the second resonator 134 and the transverse direction is in a range of −50 degrees to −40 degrees.

In an embodiment, a third included angle α3 is formed between the first symmetry axis of the first resonator 124 and the second symmetry axis of the second resonator 134. Specifically, the third included angle α3 is 90 degrees, such that the first resonator 124 and the second resonator 134 are in a rotational symmetry of 90 degrees.

In an embodiment, the first dielectric plate 121 or the second dielectric plate 131 is selected from one or more of a polyimide plate or a silica plate. The first dielectric plate 121 or the second dielectric plate 131 has a side length in a range of 66-86 microns. The first dielectric plate 121 or the second dielectric plate 131 has a thickness in a range of 50-70 microns. It is to be understood that in selecting a material for fabricating the first dielectric plate 121 or the second dielectric plate 131, it is necessary to select a material with good terahertz pulse transmittance. With the use of a polyimide material or a silica material with high transmittance of the terahertz pulse 300, when the terahertz pulse 300 passes through the first dielectric plate 121 or the second dielectric plate 131, the terahertz pulse 300 has a small loss.

In an embodiment, the first transverse metal wire grating 122 is positioned on a first plane, the first longitudinal metal wire grating 123 is positioned on a second plane, and the first resonator 124 is positioned on a third plane. The first plane, the second plane, and the third plane are arranged in parallel. By arranging the planes of the first transverse metal wire grating 122, the first longitudinal metal wire grating 123, and the first resonator 124 in parallel, when the terahertz pulse 300 is incident on the first resonator 124, the transmission direction of the terahertz pulse 300 may be perpendicular or approximately perpendicular to the planes of the first transverse metal wire grating 122, the first longitudinal metal wire grating 123, and the first resonator 124, thereby facilitating the first resonator 124 to achieve its function of modulating the carrier-envelope phase of the terahertz pulse 300. The geometric centers of the first transverse metal wire grating 122, the first longitudinal metal wire grating 123, and the first resonator 124 are arranged coaxially as desired to better achieve its function of modulating the carrier-envelope phase of the terahertz pulse 300.

In an embodiment, the second transverse metal wire grating 132 is positioned on a fourth plane, the second longitudinal metal wire grating 133 is positioned on a fifth plane, and the second resonator 134 is positioned on a sixth plane. The fourth plane, the fifth plane, and the sixth plane are arranged in parallel. Likewise, by arranging the planes of the second transverse metal wire grating 132, the second longitudinal metal wire grating 133, and the second resonator 134 in parallel, when the terahertz pulse 300 is incident on the second resonator 134, the transmission direction of the terahertz pulse 300 may be perpendicular or approximately perpendicular to the planes of the second transverse metal wire grating 132, the second longitudinal metal wire grating 133, and the second resonator 134, thereby facilitating the second resonator 134 to achieve its function of modulating the carrier-envelope phase of the terahertz pulse 300. The geometric centers of the second transverse metal wire grating 132, the second longitudinal metal wire grating 133, and the second resonator 134 are arranged coaxially as desired to better achieve its function of modulating the carrier-envelope phase of the terahertz pulse 300.

In an embodiment, the first plane and the fourth plane are arranged coplanar; and/or the second plane and the fifth plane are arranged coplanar; and/or the third plane and the sixth plane are arranged coplanar. At this time, since the first transverse metal wire grating 122, the first longitudinal metal wire grating 123, and the first resonator 124 in the first phase modulator 120 are substantially identical to the second transverse metal wire grating 132, the second longitudinal metal wire grating 133, and the second resonator 134 in the second phase modulator 130, the terahertz pulse 300 after the terahertz pulse 300 passes through the first phase modulator 120 and the substrate 110 differs from the terahertz pulse 300 after the terahertz pulse 300 passes through the second phase modulator 130 and the substrate 110 only in that the phase angle of the terahertz pulse 300 is changed, while other properties remain substantially unchanged.

In an embodiment, the first phase modulator or the second phase modulator has a transverse width in a range of 66-86 microns. The first phase modulator or the second phase modulator has a longitudinal width in a range of 66-86 microns.

In an embodiment, metal portions of the first transverse metal wire grating 122, the first longitudinal metal wire grating 123, the second transverse metal wire grating 132, or the second longitudinal metal wire grating 133 are selected from one or more of a gold sheet, a copper sheet, or an aluminum sheet.

In this embodiment, the first transverse metal wire grating 122 includes a plurality of first transverse metal wires 1221 extending along a transverse direction, and the plurality of first transverse metal wires 1221 are arranged along a longitudinal direction. Specifically, each first transverse metal wire 1221 has a cycle d of 16 microns and a thickness in a range of 0.2-0.8 micron. An edge gap g between two adjacent first transverse metal wires 1221 is 8 microns. That is, the first transverse metal wire 1221 in the first transverse metal wire grating 122 has a duty cycle g/d of 1/2. In this embodiment, the first transverse metal wire grating 122 has a long side of 76 microns; and the first transverse metal wire grating 122 has a short side of 68 microns. Specifically, the first transverse metal wire grating 122 has a short side in the transverse direction and a long side in the longitudinal direction.

In this embodiment, the first longitudinal metal wire grating 123 includes a plurality of first longitudinal metal wires 1231 extending along a longitudinal direction. The plurality of first longitudinal metal wires 1231 are arranged along a longitudinal direction. Specifically, each first longitudinal metal wire 1231 has a cycle d of 16 microns and a thickness in a range of 0.2-0.8 micron. An edge gap g between two adjacent first longitudinal metal wires 1231 is 8 microns. That is, the first longitudinal metal wire 1231 in the first longitudinal metal wire grating 123 has a duty cycle d/g of 1/2. In this embodiment, the first longitudinal metal wire grating 123 has a long side of 76 microns; and the first longitudinal metal wire grating 123 has a short side of 68 microns. Specifically, the first longitudinal metal wire grating 123 has a short side in the transverse direction and a long side in the longitudinal direction.

In this embodiment, the second transverse metal wire grating 132 includes a plurality of second transverse metal wires 1321 extending along a transverse direction, and the plurality of second transverse metal wires 1321 are arranged along a longitudinal direction. Specifically, each second transverse metal wire 1321 has a cycle d of 16 microns and a thickness in a range of 0.2-0.8 micron. An edge gap g between two adjacent second transverse metal wires 1321 is 8 microns. That is, the second transverse metal wire 1321 in the second transverse metal wire grating 132 has a duty cycle d/g of 1/2. In this embodiment, the second transverse metal wire grating 132 has a long side of 76 microns; and the second transverse metal wire grating 132 has a short side of 68 microns. Specifically, the second transverse metal wire grating 132 has a short side in the transverse direction and a long side in the longitudinal direction.

In this embodiment, the second longitudinal metal wire grating 133 includes a plurality of second longitudinal metal wires 1331 extending along a longitudinal direction. The plurality of second longitudinal metal wires 1331 are arranged along a longitudinal direction. Specifically, each second longitudinal metal wire 1331 has a cycle d of 16 microns and a thickness in a range of 0.2-0.8 micron. An edge gap g between two adjacent second longitudinal metal wires 1331 is 8 microns. That is, the second longitudinal metal wire 1331 in the second longitudinal metal wire grating 133 has a duty cycle d/g of 1/2. In this embodiment, the second longitudinal metal wire grating 133 has a long side of 76 microns; and the second longitudinal metal wire grating 133 has a short side of 68 microns. Specifically, the second longitudinal metal wire grating 133 has a short side in the transverse direction and a long side in the longitudinal direction.

It is to be understood that the first phase modulation array A is formed by a plurality of first phase modulators 120. The second phase modulation array B is formed by a plurality of second phase modulators 130. At this time, a transverse side length of the substrate 110 is greater than or equal to a sum of transverse side lengths of the first phase modulator 120 and the second phase modulator 130. A longitudinal side length of the substrate 110 is greater than or equal to a sum of longitudinal side lengths of the first phase modulator 120 and the second phase modulator 130. Accordingly, the first phase modulator 120 and the second phase modulator 130 may be completely arranged on the substrate 110.

In application of the terahertz carrier-envelope phase shifter 100 provided by the embodiments of the present disclosure, the beam diameter of the incident terahertz pulse 300 is 152 microns. When the terahertz-pulse 300 is normally incident in front of the first phase modulation array A, passes through the first phase modulation array A, and then exits from the left side of the rear surface of the high-resistance substrate 110, the resulting time domain waveform of the terahertz-pulse 300 is shown by a solid line in FIG. 8. At this time, the polarity of the electric field of the terahertz pulse 300 is negative. If the terahertz carrier-envelope phase shifter 100 is mechanically displaced, so that the terahertz pulse 300 is normally incident in front of the second phase modulation array B, passes through the second phase modulation array B, and then exits from the right side of the rear surface of the high-resistance substrate 110, the resulting time domain waveform of the terahertz pulse 300 is shown by a dotted line in FIG. 8. At this time, the polarity of the electric field of the terahertz pulse 300 is positive.

Figure 8:
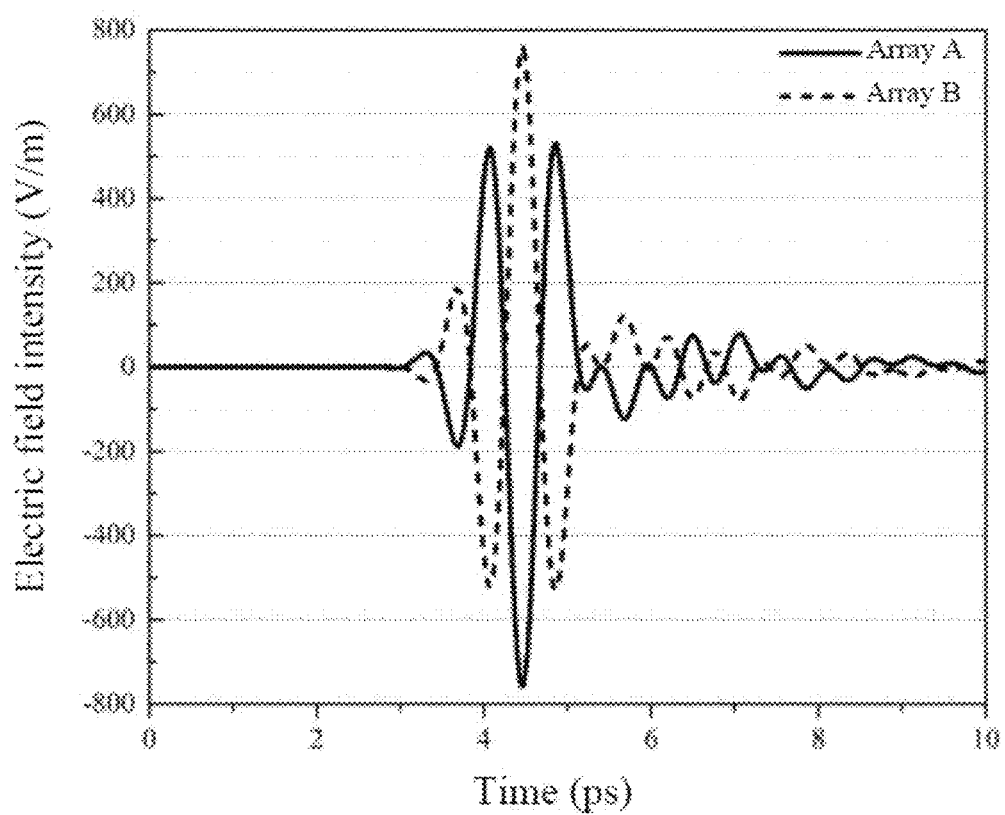
FIG. 8 is a schematic diagram of time domain waveforms of a terahertz pulse incident in front of a first phase modulation array and a second phase modulation array, separately.
Figure 9:
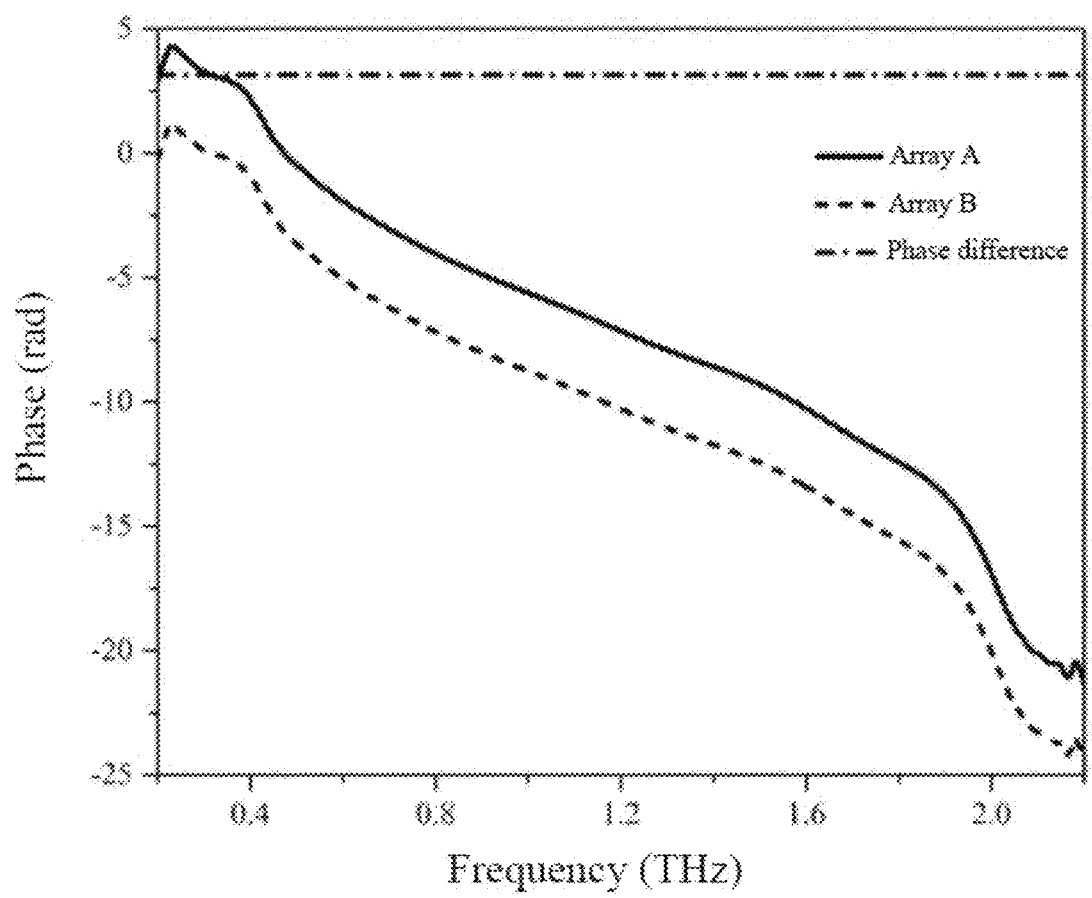
FIG. 9 is a phase spectrum obtained by Fourier transforming the time domain waveforms of FIG. 8.

The time domain waveforms of the terahertz pulse 300 in FIG. 8 are Fourier transformed to obtain a carrier-envelope phase diagram of the terahertz pulse 300. The carrier-envelope phase of the terahertz pulse 300 modulated through the first phase modulation array A is shown by a solid line in FIG. 9; and the carrier-envelope phase of the terahertz pulse 300 modulated through the second phase modulation array B is shown by a dotted line in FIG. 9. At this time, the difference between the carrier-envelope phase of the terahertz pulse 300 modulated through the first phase modulation array A and the carrier-envelope phase of the terahertz pulse 300 modulated through the second phase modulation array B is shown by a dot-and-dash line in FIG. 9. It is seen that by arranging the first phase modulation array A and the second phase modulation array B on the substrate 110, where the phase modulation angles of the first phase modulation array A and the second phase modulation array B on the terahertz pulse 300 are different, the terahertz carrier-envelope phase can be modulated through the mechanical displacement of the terahertz carrier-envelope phase shifter 100.

Compared with the prior art, the terahertz carrier-envelope phase shifter 100 provided by the embodiments of the present disclosure has the following advantages.

1. The desired carrier-envelope phase is obtained by simple mechanical displacement that enables the terahertz pulse to pass through phase modulation arrays in different areas on the high-resistance substrate, so as to adjust the polarity of the electric field of the terahertz pulse, without complicated combination of wave plates with various functions.
2. The terahertz carrier-envelope phase shifter 100 is applicable in various scenarios, and its application scope may be extended to other electromagnetic frequency bands.
3. The terahertz carrier-envelope phase shifter 100 is light, thin, efficient, and easy for on-chip integration.

Figure 10:
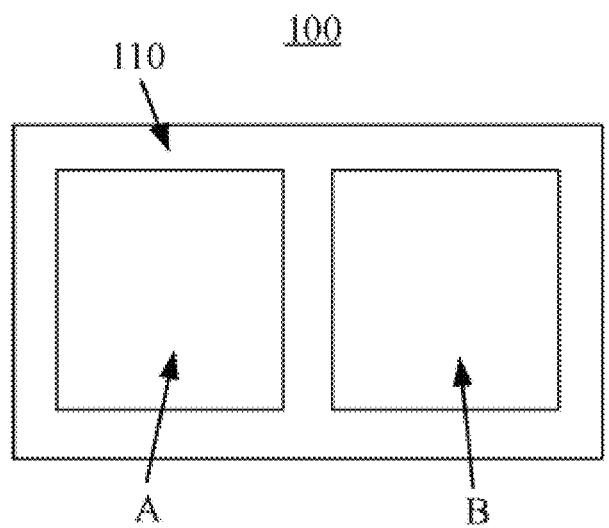
FIG. 10 is a schematic diagram of positions of the first phase modulation array and the second phase modulation array of FIG. 1.
Figure 11:
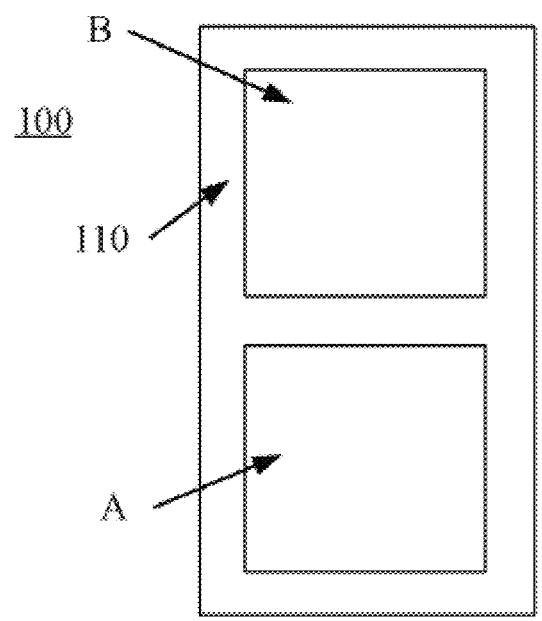
FIG. 11 is a schematic diagram of positions of phase modulation arrays according to another embodiment of the present disclosure.
Figure 12:
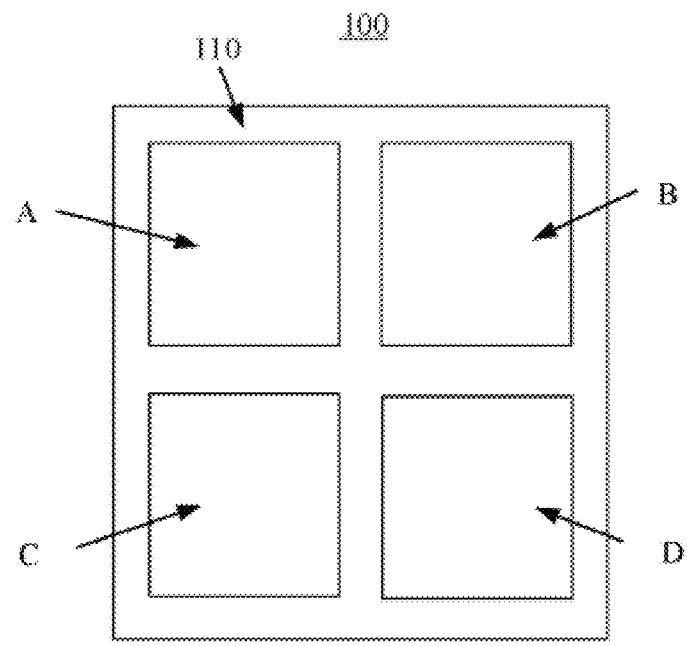
FIG. 12 is a schematic diagram of positions of phase modulation arrays according to yet another embodiment of the present disclosure.
Figure 13:
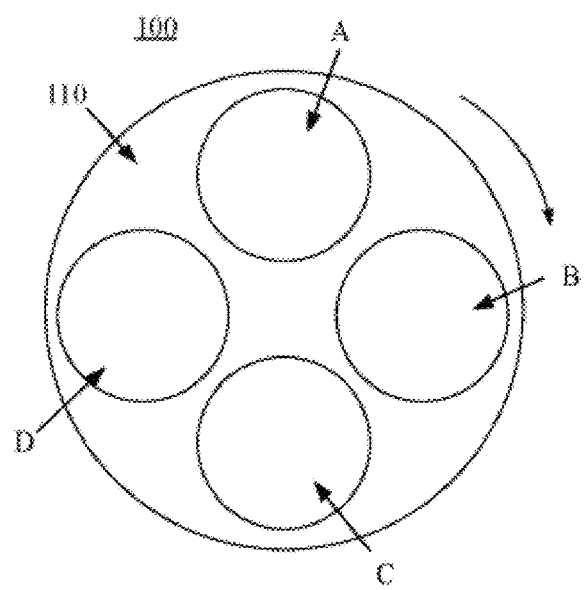
FIG. 13 is a schematic diagram of positions of phase modulation arrays according to still another embodiment of the present disclosure.

It is to be understood that the terahertz carrier-envelope phase shifter 100 provided by the embodiments of the present disclosure is not limited to the embodiments above. In this embodiment, the first phase modulation array A and the second phase modulation array B are arranged on left and right sides of the substrate 110, as shown in FIG. 10. In practice, referring to FIG. 11, the first phase modulation array A and the second phase modulation array B may be arranged on upper and lower sides of the substrate 110 in another embodiment. At this time, the carrier-envelope phase of the terahertz pulse 300 may be changed by moving the terahertz carrier-envelope phase shifter 100 up and down. Likewise, referring to FIG. 12, the terahertz carrier-envelope phase shifter 100 includes a substrate 110, and a first phase modulation array A, a second phase modulation array B, a third phase modulation array C, and a fourth phase modulation array D arranged on a surface of the substrate 110 in another embodiment. The third phase modulator C has a phase modulation angle that is different from those of the first phase modulator A and the second phase modulator B. The fourth phase modulator D has a phase modulation angle that is different from those of the first phase modulator A, the second phase modulator B, and the third phase modulator C. The first phase modulation array A, the second phase modulation array B, the third phase modulation array C, and the fourth phase modulation array D are arranged in a matrix. At this time, the carrier-envelope phase of the terahertz pulse 300 may be changed by moving the terahertz carrier-envelope phase shifter 100 up and down or left and right. Likewise, referring to FIG. 13, the terahertz carrier-envelope phase shifter 100 includes a substrate 110, and a first phase modulation array A, a second phase modulation array B, a third phase modulation array C, and a fourth phase modulation array D arranged on a surface of the substrate 110. The third phase modulator C has a phase modulation angle that is different from those of the first phase modulator A and the second phase modulator B. The fourth phase modulator D has a phase modulation angle that is different from those of the first phase modulator A, the second phase modulator B, and the third phase modulator C. The first phase modulation array A, the second phase modulation array B, the third phase modulation array C, and the fourth phase modulation array D are arranged circumferentially. At this time, the carrier-envelope phase of the terahertz pulse 300 may be changed by rotating the terahertz carrier-envelope phase shifter 100.

The foregoing shows only preferred embodiments of the present disclosure, which do not limit the patent scope of the present disclosure. Any equivalent structural transformation made by utilizing the description and attached drawings of the present disclosure or direct/indirect application in other relevant technical fields under the inventive concept of the present disclosure is included in the patent protection scope of the present disclosure.

The invention claimed is:

1. A terahertz carrier-envelope phase shifter, comprising:
   a substrate;
   a first phase modulator arranged on a surface of the substrate, wherein the first phase modulator has a first phase modulation angle; and
   a second phase modulator arranged on the surface of the substrate, wherein the second phase modulator has a second phase modulation angle that is different from the first phase modulation angle, so that a carrier-envelope phase of a terahertz pulse after the terahertz pulse passes through the first phase modulator and the substrate is different from a carrier-envelope phase of the terahertz pulse after the terahertz pulse passes through the second phase modulator and the substrate;
   the first phase modulator comprises a first dielectric plate, a first transverse metal wire grating, a first longitudinal metal wire grating, and a first resonator, wherein the first transverse metal wire grating and the first longitudinal metal wire grating are arranged on two opposite surfaces of the first dielectric plate, the first resonator is arranged inside the first dielectric plate and is positioned between the first transverse metal wire grating and the first longitudinal metal wire grating, the first resonator has a first symmetry axis, and the first symmetry axis is at a first included angle to a transverse direction.

2. The terahertz carrier-envelope phase shifter according to claim 1, wherein
   the second phase modulator comprises a second dielectric plate, a second transverse metal wire grating, a second longitudinal metal wire grating, and a second resonator, wherein the second transverse metal wire grating and the second longitudinal metal wire grating are arranged on two opposite surfaces of the second dielectric plate, the second resonator is arranged inside the second dielectric plate and is positioned between the second transverse metal wire grating and the second longitudinal metal wire grating, the second resonator has a second symmetry axis, and the second symmetry axis is at a second included angle to the transverse direction.

3. The terahertz carrier-envelope phase shifter according to claim 2, wherein the first included angle between the first symmetry axis of the first resonator and the transverse direction is different from the second included angle between the second symmetry axis of the second resonator and the transverse direction; and/or
   the first transverse metal wire grating is positioned on a first plane, the first longitudinal metal wire grating is positioned on a second plane, the first resonator is positioned on a third plane, and the first plane, the second plane, and the third plane are arranged in parallel; and/or
   geometric centers of the first transverse metal wire grating, the first longitudinal metal wire grating, and the first resonator are arranged coaxially; and/or
   the second transverse metal wire grating is positioned on a fourth plane, the second longitudinal metal wire grating is positioned on a fifth plane, the second resonator is positioned on a sixth plane, and the fourth plane, the fifth plane, and the sixth plane are arranged in parallel; and/or
   geometric centers of the second transverse metal wire grating, the second longitudinal metal wire grating, and the second resonator are arranged coaxially.

4. The terahertz carrier-envelope phase shifter according to claim 3, wherein
   the first plane and the fourth plane are arranged coplanar; and/or
   the second plane and the fifth plane are arranged coplanar; and/or
   the third plane and the sixth plane are arranged coplanar.

5. The terahertz carrier-envelope phase shifter according to claim 2, wherein the first phase modulator or the second phase modulator has a transverse width in a range of 66-86 microns; and the first phase modulator or the second phase modulator has a longitudinal width in a range of 66-86 microns; and/or
   the first dielectric plate or the second dielectric plate has a side length in a range of 66-86 microns; and the first dielectric plate or the second dielectric plate has a thickness in a range of 50-70 microns; and/or
   a beam diameter of the terahertz pulse is 0.5-1.0 times a longitudinal side length of the first phase modulator or the second phase modulator.

6. The terahertz carrier-envelope phase shifter according to claim 2, wherein
   metal portions of the first transverse metal wire grating, the first longitudinal metal wire grating, the second transverse metal wire grating, or the second longitudinal metal wire grating are selected from one or more of a gold sheet, a copper sheet, or an aluminum sheet; and/or
   the metal portions of the first transverse metal wire grating, the first longitudinal metal wire grating, the second transverse metal wire grating, or the second longitudinal metal wire grating have a thickness in a range of 0.2-0.8 micron.

7. The terahertz carrier-envelope phase shifter according to claim 2, wherein the first transverse metal wire grating, the first longitudinal metal wire grating, the second transverse metal wire grating, or the second longitudinal metal wire grating has a long side of 76 microns; and/or
   the first transverse metal wire grating, the first longitudinal metal wire grating, the second transverse metal wire grating, or the second longitudinal metal wire grating has a short side of 68 microns; and/or
   the metal portions of the first transverse metal wire grating, the first longitudinal metal wire grating, the second transverse metal wire grating, or the second longitudinal metal wire grating have a width of 8 microns; and/or
   an edge gap between two adjacent metal portions of the first transverse metal wire grating, the first longitudinal metal wire grating, the second transverse metal wire grating, or the second longitudinal metal wire grating is 8 microns.

8. The terahertz carrier-envelope phase shifter according to claim 2, wherein the first resonator or the second resonator is selected from one of a V-shaped metal sheet or a C-shaped metal sheet; and/or the first resonator or the second resonator has a thickness in a range of 0.2-0.8 micron; and/or the first resonator or the second resonator has an outer diameter in a range of 25-40 microns; and/or the first resonator or the second resonator has an inner diameter in a range of 20-35 microns; and/or the first resonator or the second resonator has an opening angle in a range of 20 degrees to 150 degrees.

9. The terahertz carrier-envelope phase shifter according to claim 2, wherein the first included angle between the first symmetry axis of the first resonator and the transverse direction is in a range of 40 degrees to 50 degrees; and/or the second included angle between the second symmetry axis of the second resonator and the transverse direction is in a range of −50 degrees to −40 degrees; and/or a third included angle is formed between the first symmetry axis of the first resonator and the second symmetry axis of the second resonator, wherein the third included angle is 90 degrees.

10. The terahertz carrier-envelope phase shifter according to claim 1, wherein a transverse side length of the substrate is greater than or equal to a sum of transverse side lengths of the first phase modulator and the second phase modulator; and/or a longitudinal side length of the substrate is greater than or equal to a sum of longitudinal side lengths of the first phase modulator and the second phase modulator; and/or the substrate has a thickness in a range of 50-100 microns.

* * * * *